Jan. 25, 1938.                    C. J. HALBORG                    2,106,212
               APPARATUS FOR BROACHING AN APERTURE IN AN
               ARTICLE RELATIVE TO ITS OUTER DIMENSION
                        Filed April 14, 1932          2 Sheets-Sheet 1
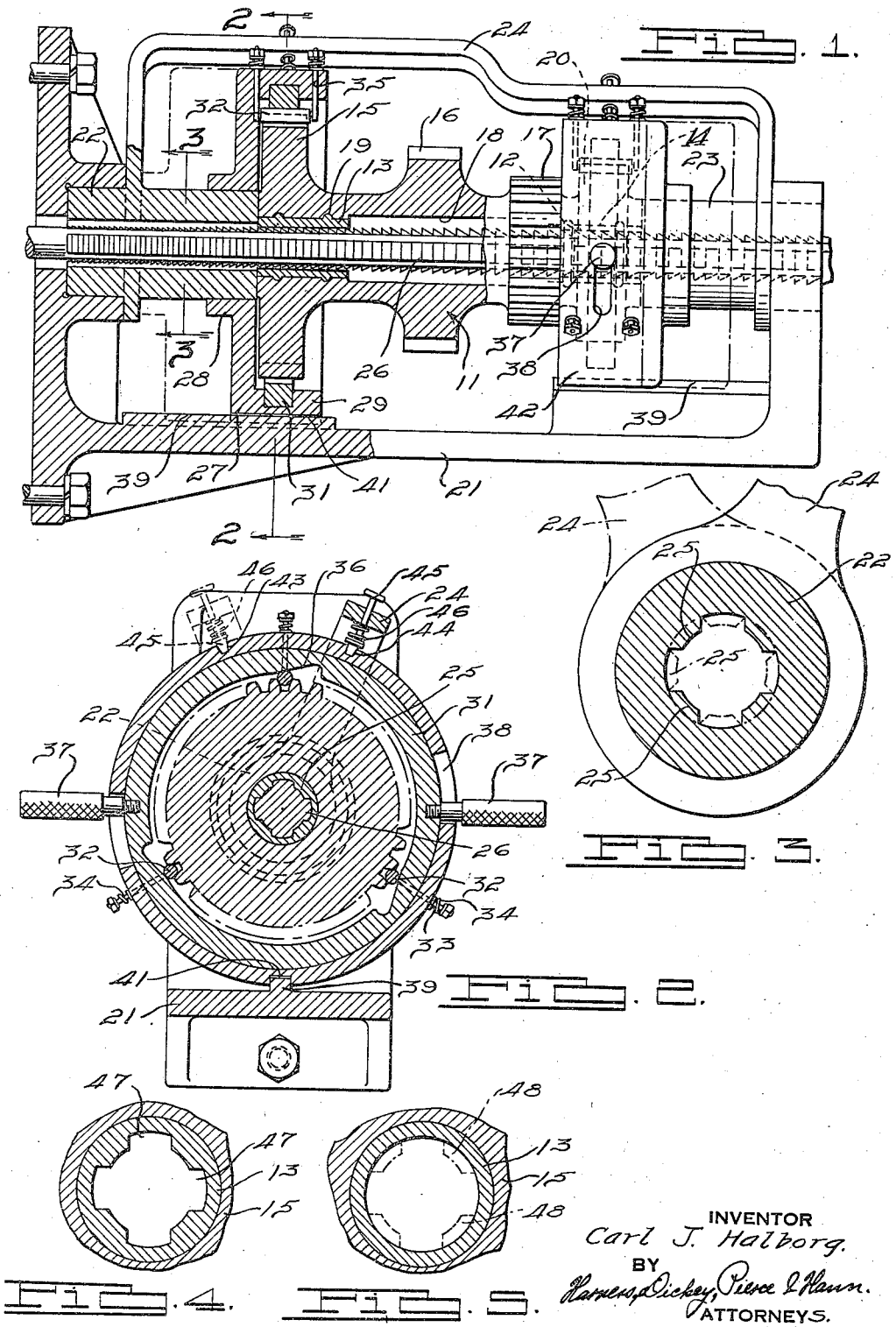
INVENTOR
Carl J. Halborg.
BY
ATTORNEYS.

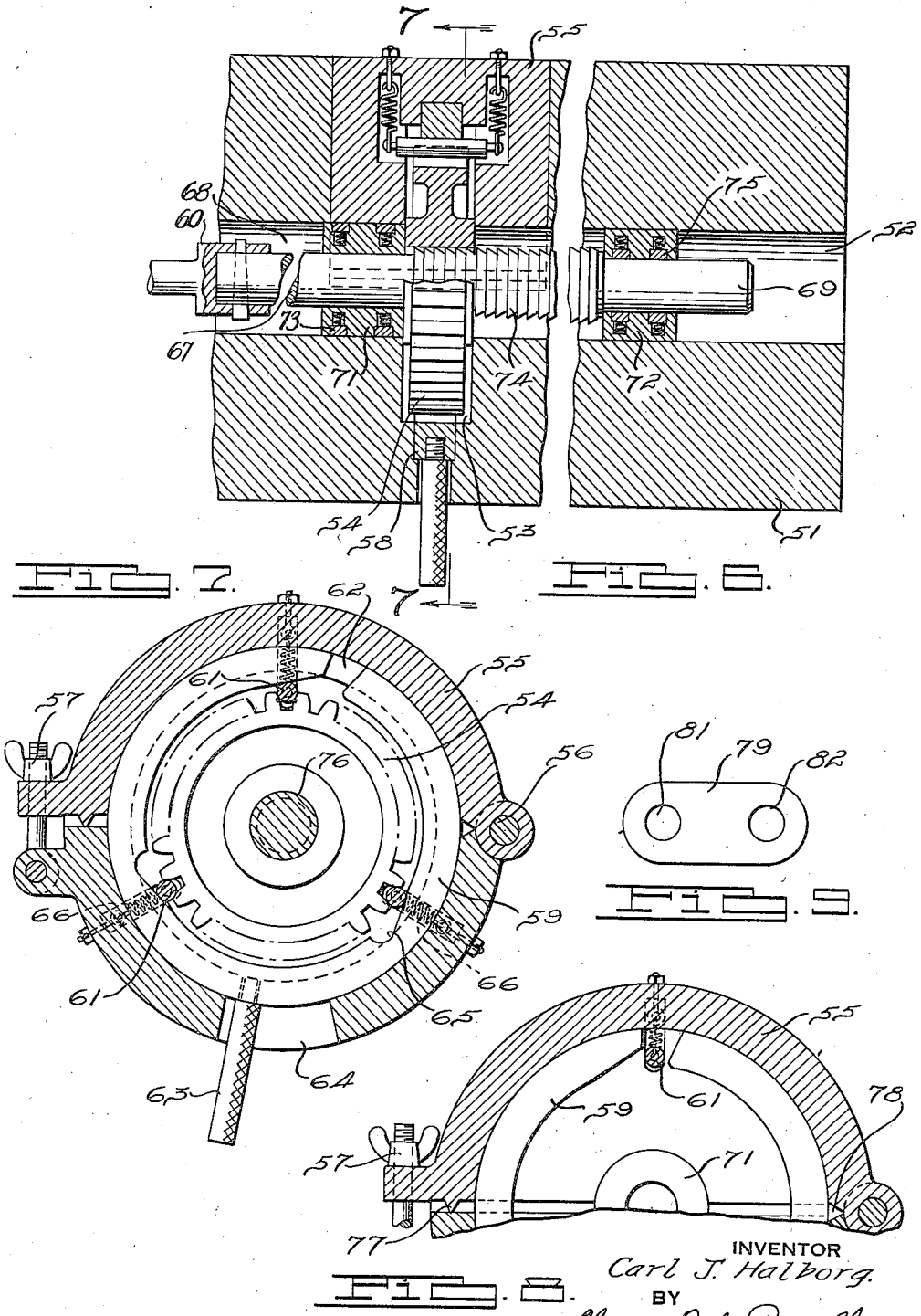

Patented Jan. 25, 1938

2,106,212

UNITED STATES PATENT OFFICE

2,106,212

APPARATUS FOR BROACHING AN APERTURE IN AN ARTICLE RELATIVE TO ITS OUTER DIMENSION

Carl J. Halborg, Detroit, Mich., assignor to Colonial Broach Company, a corporation of Michigan Application April 14, 1932, Serial No. 605,272

5 Claims. (Cl. 90—33)

My invention relates to method and means for broaching and particularly to methods and means employed to broach one surface relative to another surface to finish the surfaces on predetermined center distances.

It has been the practice in the past to ream a hole in a member before a machining operation is made relative thereto to employ the finished reamed hole as a center about which the finished outer periphery of the work is completed. When, for example, gears are to be formed in a blank, the center hole is first drilled, punched, reamed or otherwise formed and finished by a broaching operation after which the gear teeth are cut in the periphery of the blank located from the finished central hole.

My present invention embodies the finishing of the central hole of gears or like work pieces or surfaces relative to each other after the outer peripheral surface has been finished and thereby locate the broaching operation from the outer periphery of the work. To accomplish this end, it is necessary to accurately locate the outer peripheral edge of the work relative to the broaching tool and to lock the work securely in position during the time the broach is being fed through the work.

When only a truing operation is required, which can be performed by a broach of short length, I find it possible to finish the central hole by a broach having continuous annular teeth by employing bearings which slide relative to the pilot ends of the broach to have the bearings disposed substantially adjacent to the cutting teeth. In this construction sufficient support will be given to the broach to prevent it from being deflected when the hole to be finished is in off center relation to the outer periphery of the element and thereby finish the hole in a single operation to very accurate dimensions relative to the periphery.

As a further extension of my invention, when a large cut is required to machine and finish the hole requiring a broach of considerable length, I find that this can be successfully accomplished by providing a spline cutting broach having four rows of equally spaced teeth, the surfaces between the rows of teeth being employed as a support which are engaged by accurately positioned spline bushings. After the broach has passed through to cut one half of the area, the bushings are revolved 45 degrees and the broach again inserted and passed through the hole to have the rows of teeth cut the remaining metal from the wall to thereby provide a complete finished hole, the center of which is accurately disposed relative to the outer periphery of the work which is accurately clamped in a supporting fixture.

Accordingly, the main objects of my invention are; to provide a method and means for broaching a hole to accurate dimensions relative to an outer peripheral surface; to provide a broach and bearings for its support which may be utilized for finishing and centrally locating a hole of a work piece relative to its outer periphery through the single passage of the broach therethrough; to provide a supporting structure for a gear element and a broach which are accurately located relative to each other and which effects the finishing and location of a central aperture through the double passage of the broach therethrough, a portion of the metal of the aperture being machined during each passage; to provide spline bushings for supporting the ends of a broach the lands of which rest in grooves between rows of teeth of the broach to support the broach adjacent to the work; and in general to provide a method and means for finishing apertures by a broaching operation to have the surfaces thereof disposed on predetermined center distances by a device which is simple in operation and economical of manufacture.

Other objects and features of novelty of my invention will be either specifically pointed out or will become apparent when referring, for a better understanding of my invention, to the following description in conjunction with the accompanying drawings, wherein:

Fig. 1 is a side view, partly in section and partly in elevation, of a broaching fixture which embodies features of my invention;

Fig. 2 is a sectional view of the structure illustrated in Fig. 1, taken on the line 2—2 thereof;

Fig. 3 is an enlarged sectional view of the structure illustrated in Fig. 1, taken on the line 3—3 thereof;

Fig. 4 is an enlarged, broken sectional view of the work, after the first passage of a broach therethrough;

Fig. 5 is an enlarged, broken sectional view of the work after the second passage of the broach therethrough;

Fig. 6 is an enlarged broken sectional view of a modified form which my invention may assume;

Fig. 7 is a sectional view of the structure illustrated in Fig. 6, taken on the line 7—7 thereof;

Fig. 8 is a broken view of the structure illustrated in Fig. 7 with the clamping member moved to release position; and Fig. 9 is an elevational view of a work piece which may be machined by my particular method.

Referring to Figs. 1 to 5 inclusive, I have illustrated a device for encompassing and positioning a transmission element 11 relative to a cutting broach 12 for enlarging and finishing the bushings 13 and 14 thereof to accurate dimensions relative to the outer periphery of the gears of the element. The element 11 is of the standard well known form having a driving gear 15 thereon which is interconnected with the driving mechanism of the transmission for rotating a gear 16 for effecting the operation of a vehicle in second speed, a gear 17 which is employed for operating the vehicle in low speed and a gear 20 for effecting the reverse operation of the vehicle. The gears 15, 16, 17 and 20 are accurately finished relative to each other and approximately located relative to an aperture 18 provided through the center of the element. The bushings 13 and 14 are then mounted in the ends of the element 11 and a swaging operation is employed for forcing the metal of the bushing within the annular grooves 19 provided in the body portion of the element, for securing the bushing relative thereto. The present invention provides for methods and means for finishing the inner surface of the bushings 13 and 14 centrally of the finished gears on the element by a broaching operation.

A bracket 21 supports a pair of rotatable bearings 22 and 23 on opposite ends of the bracket, which are interconnected by an element 24 which retains the bearings in axially aligned relation. As illustrated more clearly in Fig. 2, the bearings 22 are provided with lands 25 which fit between the rows of cutting teeth 26 provided on the broach 12 to thereby engage and support the body portion of the broach closely adjacent to the work. In the construction illustrated, the broach is provided with four rows of teeth 26 which are diametrically disposed to each other and which therefore cut four grooves in the bushings 13 and 14 of a width to machine one half of the surface thereof.

For locating the element 11 relative to the bearings 22 and 23 I mount a housing 27 on the bearing 22 having a hub 28 which is slidable relative to the outer surface of the bushing 22 and which accurately centers the housing relative thereto. The housing is provided with an annular rim 29 wherein a ring 31 is mounted for limited rotational movement. Positioning rollers 32 are suspended from the rim 29 by rods 33 having retrieving springs 34 thereon and which are mounted through apertures 35 for retaining the rollers in predetermined radial position substantially 120 degrees from each other. The rollers 32 are of such dimension as to engage the teeth substantially on the pitch line to thereby accurately center the gear relative to the housing 27 and therefore the bushing 22 when the ring 31 is rotated to have the camming surfaces 36 thereof force the rollers into intimate engagement with the teeth against the bias of the springs 34.

The ring 31 is rotated by one or more handles 37 which extend through elongated apertures 38 provided in the rim 29 for permitting a limited movement of the handle relative thereto and therefore of the ring 31 to effect the movement of the rollers 32 inwardly when rotated in a clockwise direction as illustrated in Fig. 2 and to release the rollers therefrom when rotated in the opposite direction to permit the springs 34 to retrieve the roller from engagement with the teeth. One or more lands 39 are provided on the bracket 21 for engagement with one or a plurality of slots 41 in the outer periphery of the housing 27 as illustrated in Figs. 1 and 2 for the purpose of accurately positioning the housing on the bushing 22 and at the same time to permit the housing to be moved longitudinally along the bushing to clear the gear 15.

A similar housing 42 is provided on the bushing 23 of smaller diameter to encompass the smaller gear 20 of the element 11 but which is otherwise exactly the same as the housing 27 above described and which therefore will not be described in detail. In either case when the element 11 is to be mounted in the device the housings 27 and 42 are slid outwardly on the bushings 22 and 23 to permit the insertion of the element 11 therebetween, after which the housings 27 and 42 are slid inwardly, toward each other, to have the housing 27 engage and locate the gear 15 and the housing 42 engage and locate the gear 20 relative to the bushings 22 and 23 respectively.

The outer surfaces of the housings 27 and 42 are provided with locating notches 43 and 44 which are engaged by locating pins 45 which are biased by springs 46 into the notches and which extend through the uniting element 24 of the bushings 22 and 23 to thereby position the bushings relative to the housings 27 and 42. For the broach 12 herein illustrated and described, the notches 43 and 44 are substantially 45 degrees apart so that after one passage of the broach 12 through the bushings 13 and 14 the rotation of the element 24 from a position in which the pin 45 engaged the slot 43 to that in which it is positioned in the slot 44, rotates the lands 25 of the bushings 22 and 23 to a position corresponding to the grooves cut within the bushings 13 and 14 to thereby have the rows of teeth 26 of the bushings in alignment with the remaining material to be machined from the bushing surfaces which will be cut therefrom upon the second passage of the broach therethrough.

It is to be understood that, if a spline aperture is to be located relative to the outer peripheral surface of the work element, a single passage of the splined broach will accurately locate the grooves therein. When necessary, a further operation may be employed to finish the inner edge of the lands relative to the bottom of the groove. It is further to be understood, that any shape of hole may be broached by this or other methods hereinafter disclosed, relative to the outer surface.

Referring to Figs. 3, 4, and 5, the operation of the cutter will readily be observed. In Fig. 3 the full line position of the lands 25 illustrates the support for the body portion of the broach 12 to have the material therebetween machined from the surface of the bushings, as illustrated in Fig. 4. In this view the slots 47 are cut in the bushings 13 and 14 by the first passage of the broach therethrough. When the element 24 has been moved to its opposite position to have the lands 25 assume the dot and dash line position, illustrated in Fig. 3, in alignment with the slots 47 cut by the broach on its first passage through the bushings, the second passage of the broach therethrough will cut the remaining metal 48 therefrom, as illustrated in dotted lines in Fig. 5. The combination of cuts to machine the metal from the points 47 and 48 of the bushings during the two successive passes of the broach therethrough, completely finishes the inner surface of the bushings 13 and 14, as illustrated in Fig. 4, which will be accurately centered relative to the outer periphery of the gears. After the finishing operation the rings 31 are operated to release the centering rollers 32 and the housings 27 and 42 are moved longitudinally of the bushings 22 and 23 respectively out of engagement with the gears 15 and 20 of the element 11, to permit the removal of the element from the device.

In Figs. 6, 7, and 8 I have shown a modified form which my invention may assume when the element, such as a gear having a central aperture which is to be finished relative to the outer gear teeth, requires such a small amount of machining that a short broaching tool may be employed. Bearings are mounted adjacent to the opposite ends of the broaching teeth and will provide sufficient support for preventing the deflection of the broach to thereby effect the accurate machining of the aperture. In Figs. 6 and 7 I have shown a cylindrical member 51 having a central aperture 52 which is in aligned relation to a recess 53, in which a gear or like work piece 54 is mounted centrally thereof to be machined. A portion 55 of the member 51 is hinged thereto about a pivot 56 and is semi-cylindrical in form having its opposite ends releasably retained by a bolt and thumbnut 57. The recess 53 provided in the element 51 is grooved at its outer edge, at 58, for receiving a cam ring 59 for the purpose of biasing rollers 61 which are similar to the rollers 32 illustrated in Fig. 1 for positioning the gear 54 centrally of the element 51. The ring 59 is opened at 62 for the purpose of permitting the roller 61 which is mounted in the element 55 to pass therefrom when the element 55 is swung about the pivot 56 to permit the removal and insertion of a work element 54. A handle 63 is provided which operates in a slot or elongated aperture 64 to permit the rotation of the camming ring 59. Camming surfaces 65 on the ring 59 actuate the rollers 61 against the bias of the springs 66 into engagement with the teeth at the pitch line thereof. The broach 67 is provided with pilot ends 68 and 69 which receive slidable bushings 71 and 72 for supporting the broach. The bushing 71 is provided with friction members 73 for engaging the surface of the aperture 52 to permit the sliding of the pilot end 68 therethrough while the bushing 71 is disposed directly adjacent to the gear 54, until such time as the front end of the teeth 74 of the broach engaging the bushing which will thereafter slide along therewith out of the end of the element 51. The bushing 72 is provided with friction elements 75 which engage the pilot end 69 of the broach to be retained against the end of the teeth 74 during the cutting operation until the bushing 72 engages the gear 54 after which the pilot end 69 of the bushing will slide therethrough. In this manner the bushings are retained as close as possible to the work for preventing the teeth of the broach from being deflected from a true center path during its passage through the work.

The operation of this particular device will now be described. After a gear has been broached the handle 63 is moved in a clockwise direction to release the rollers 61 from engaging the finished gear 54 and to have the opening 62 thereof disposed opposite to the roller 61 mounted on the element 65, as illustrated in Fig. 8. The thumb nut 57 is then loosened on the bolt and swung out of engagement therewith to permit the lever 55 to be swung about the pivot 56 so that the gear 54 may be tilted from alignment with the camming ring 59 and removed from the recess 53. A new gear is then inserted within the recess 53 and the element 55 is swung about the pivot 56 and clamped to the member 51 by the thumb nut and bolt 57. The handle 63 is then moved to turn the camming ring 69 in a clockwise direction to have camming surfaces 65 thereof force the rollers 61 into engagement with the teeth of the gear or work 54.

The bushing 71 is slid into the aperture 52 on the left hand side of the device, as viewed in Fig. 6, and moved into engagement with the gear 54. The bushing 72 is disposed on the pilot end 69 of the broach until it abuts against the teeth 74 thereof and the pilot end 68 of the broach is inserted through the right hand end of the aperture 52 of the element 51 through the central opening in the work 54 and the opening of the bushing 71. The broach is then pulled or pushed through the aperture 52 by a pull bar 60 with the pilot end of the broach sliding in the bushing 71 until the teeth 74 thereof engage the bushing and move it therealong. The bushing 72 moves with the pilot end of the broach until it abuts against the work, after which the end will slide out of the bushing as the aperture of the gear 54 is finished.

It is readily apparent that the central aperture of the work will be finished accurately relative to its location centrally of the teeth of the gear which will be effected through the single operation of the broach. After the gear is finished in this manner the bushing 71 is removed from the broach and inserted in the aperture 52 while the bushing 72 is removed therefrom and inserted on the pilot end 69 of the broach. A new gear is then positioned within the recess 53 and the broach is again inserted within the right hand end of the aperture 52 to be moved through the work.

While I have illustrated methods and means for machining a central hole relative to the outer periphery of a cylindrical element, it is to be understood that the location of any surfaces relative to another may be accomplished by similar methods and means to be applied to any type of surfaces or apertures as will be readily apparent to one skilled in the art. I have illustrated in Fig. 9, a link 79 which may be provided with two apertures 81 and 82 that are to be accurately disposed a predetermined distance from each other when finished. In this construction the broaches would be accurately guided through a pair of apertures 52 which would be disposed a predetermined distance from each other corresponding to the distance to be accurately established between the apertures 81 and 82 in the link 79. Other elements having surfaces to be located relative to each other may, in a like manner, be machined, the link shown in Fig. 9 being illustrative, from which it will be readily apparent to those skilled in the art that many other types of elements may be machined by the method and means herein described.

As a further extension of my invention, I have illustrated in Figs. 7 and 8, a means for permitting the hinged element 55 to be accurately clamped relative to the member 51 each time that it is disposed relatively thereto which includes the provision of a knife edge 77 adjacent to the clamping end of the element 55 and a cutaway portion 78 adjacent to the hinge end thereof. In this construction any shavings, dirt or grime that may collect about the device will be ineffective for preventing the accurate positioning of the element 55 adjacent to the member 51 and will therefore always be located in exact relation to locate a gear accurately to the aperture 52. In this manner the finished gears will have their central aperture located accurately relative to the pitch line of the teeth and will be machined after the gear teeth have been finished.

While I have described and illustrated several embodiments of my invention, it will be apparent to those skilled in the art that various changes, omissions, additions and substitutions may be made therein without departing from the spirit and scope of my invention, as set forth in the accompanying claims.

I claim as my invention:

1. A broaching fixture including, in combination, a bracket for supporting centrally aligned spline bushings, a splined broach slidable through said bushings with lands of bushings disposed in the grooves of the broach for engaging the body portion thereof, means disposed between said bushings for supporting and accurately locating the outer peripheral edge of the work element relative to the broach, and means for drawing the broach through the work element.

2. A broaching fixture including, in combination, a bracket for supporting centrally aligned spline bushings, a splined broach slidable through said bushings with lands of bushings disposed in the grooves of the broach for engaging the body portion thereof, means for supporting and accurately locating the peripheral area of the work element relative to the broach, means for drawing the broach through the work element to cut grooves therein, and means for rotating said bushings and broach to have the lands of the bushings disposed in alignment with the grooves cut in the work element whereby the second passage of the broach therethrough will machine the remaining metal to be cut therefrom.

3. A broaching fixture including, in combination, a bracket for supporting a pair of splined bushings in aligned relation, means for interconnecting said bushings for rotating them a predetermined amount, a housing on said fixture medial of said bushings, centering means for an element disposed in said housing for engaging and supporting the periphery of the element relative to the center of the bushings, a splined broach movable through said bushings having lands engaging the body of the broach, means for moving the broach through the work for machining substantially half of the metal from the aperture through the work, and means for rotating and positioning said bushings and broach to have the lands of the bushings aligned with the grooves cut by the broach whereby a second passage of the broach through the device will finish the machining operation of the aperture.

4. A fixture for effecting the machining of a gear by a broaching operation which includes, in combination, means for supporting a gear, a splined broach, splined bushings for engaging the body portion of the broach for machining a portion of the surface of an aperture through the gear, means in said fixture for supporting said bushings, and means for rotating the bushings to align the teeth of the broach with the remaining metal of the aperture to be machined which is effected during the second passage of the broach therethrough.

5. A fixture for supporting a splined broach for effecting the machining of an aperture relative to the periphery of the work which includes, in combination, spaced bushings having lands projecting into grooves of the broach to engage the body portion thereof, means centrally disposed relative to said bushings for supporting said work, means in said fixture for positioning said bushings, means for operating said broach through the work to machine grooves therein, and means for rotating the bushings to align the lands of the bushings with the machined grooves to have the teeth of the broach available for finishing the machining operation on the work.

CARL J. HALBORG.